United States Patent [19]
Blunck et al.

[11] 3,863,490
[45] Feb. 4, 1975

[54] METHOD OF AND APPARATUS FOR AVOIDING ERRONEOUS INDICATIONS AS A RESULT OF THE PROPERTIES OF THE PAPER IN APPARATUS WHICH USE A PAPER TAPE AS MEASURING MEANS

[75] Inventors: Otto Blunck; Karl-Heinz Retzow, both of Hamburg, Germany

[73] Assignee: Firma H. Maihak AG, Hamburg, Germany

[22] Filed: Apr. 10, 1973

[21] Appl. No.: 349,730

[30] Foreign Application Priority Data
Apr. 11, 1972 Germany.............................. 2217285

[52] U.S. Cl. ................................................. 73/28
[51] Int. Cl. .......................................... G01n 21/28
[58] Field of Search ............ 73/28, 27; 356/38, 207, 356/209; 340/237 R, 237 S

[56] References Cited
UNITED STATES PATENTS
2,076,554  4/1937  Drinker et al. ...................... 73/28 X
2,768,370  10/1956  Maninger........................... 356/38 X
3,653,773  4/1972  Childs................................ 73/28 X
3,654,801  4/1972  Keefer et al. ........................... 73/28

Primary Examiner—Richard C. Queisser
Assistant Examiner—Stephen A. Kreitman
Attorney, Agent, or Firm—Ernest G. Montague; Karl F. Ross; Herbert Dubno

[57] ABSTRACT

A method of and an apparatus for avoiding errors in indication due to the properties of the paper in apparatus, using a paper tape as means analyzing a gas, which produces momentarily a presignal corresponding to the quality of the paper at the same point of the paper tape upon the commencement of the action of the gas. Then electronically storing a signal fed continuously during the action of the gas into a difference stage, and feeding the difference between the presignal and the final determined at the end of the time of action of the gas from the difference stage to an electronic storage stage, and causing the difference to be indicated.

2 Claims, 4 Drawing Figures

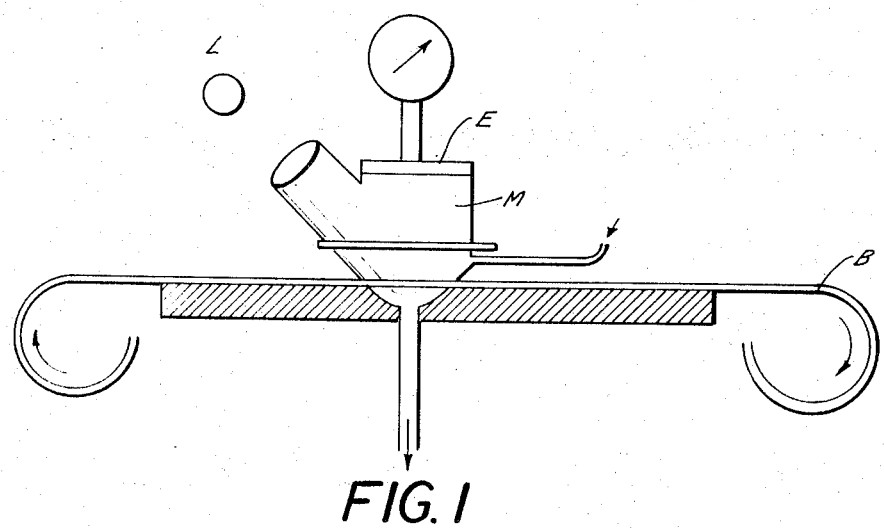
FIG. 1
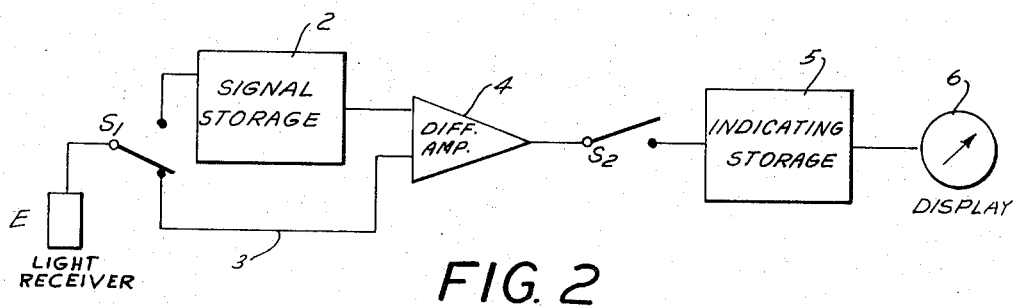
FIG. 2
FIG. 4
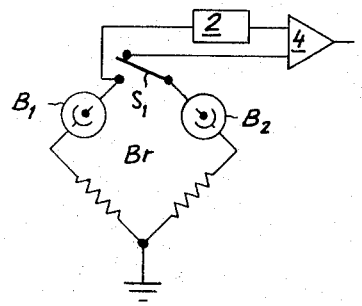
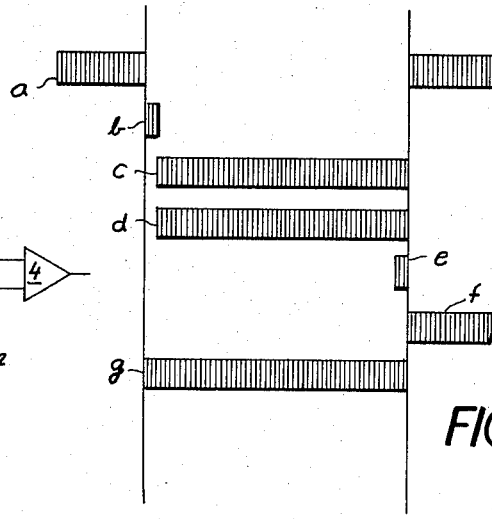
FIG. 3

METHOD OF AND APPARATUS FOR AVOIDING ERRONEOUS INDICATIONS AS A RESULT OF THE PROPERTIES OF THE PAPER IN APPARATUS WHICH USE A PAPER TAPE AS MEASURING MEANS

The present invention relates to a measuring apparatus which employs a tape of test paper as the measuring means analysis. As a result of their simple construction, such apparatus is are very dependable and, due to the high measurement sensitivity, permits the measurement of dust or the analysis of gases of such a low concentration, that the analysis can only be carried out at great expense with other apparatus.

The great disadvantage of such a tape apparatus is that in error is produced by variations in the caracter of the paper to be used and which in many cases amounts to 10% of the measurement range. In this way the detection of small changes in concentration becomes very difficult and in extreme cases almost impossible.

The apparatus known heretofore is constructed as described below.

A tape of test paper which responds to the gas to be analyzed and is discolored to a greater or lesser extent by the action of the gas, depending on the concentration, is located tightly stretched in a measurement chamber. The gas to be measured is fed in constant quantity to this measurement chamber. The paper tape is exposed to the gas for a given period of time and thereupon advanced by an amount equal to the width of the window, so that again a fresh piece of paper can be acted on by the gas. The paper tape is illuminated by a lamp. The light reflected from the paper acts on a light receiver. The light derived from the paper which is located in the measurement chamber and has been discolored to a greater or lesser extent is fed to the receiver whose output signal constitutes a measure of the concentration of gas. The zero point is adjusted electrically in accordance with the background brightness of the fresh paper before it has been acted on by the gas; this presupposes that the corresponding source of electricity will remain constant for a long time.

However, despite care in manufacture, the paper tapes differ greatly; the roughness of the surface in particular creates error so that a zero point correction is necessary prior to each measurement.

The apparatus can also be equipped with a comparison chamber is introduced, which is of exactly the same construction as the measurement chamber; in the comparison chamber the tape is in an atmosphere free of the gas, which is to be analyzed. The illuminating of the sections of tape in the measurement and comparison chambers is effected by the same lamp. A second light receiver which is connected in a bridge circuit with the light receiver of the measurement chamber takes up the light which is reflected from the fresh paper which has not been treated by the gas. To be sure, an improvement is hereby obtained as compared with the first-mentioned device, but even with this arrangement, using a comparison chamber and bridge circuit of the light receivers, full compensation for the nonuniformity of the paper tapes cannot be obtained, as the unsteady recording of the output signal shows, since the comparison point on the tape is not the same as the measurement point.

Since the measurement tape must be pervious to gas and absorptive, in order to take up the reagent and bring it intimately into contact with the gas to be measured, smooth material, for instance plastic, cannot be used. It is therefore necessary to use a so-called test paper. However, a paper tape is formed of individual paper fibers, so that the tape is not uniform and even at points directly adjacent to each other exhibits a difference in luster, surface structure and thickness, which cannot be avoided, even when great care is observed during manufacture of the tape.

An improvement can be obtained by detecting the background value of the support at the same point as that at which the measurement of the light is effected after the introduction of the substance to be measured. The measurement is divided into two parts, first adjustment of the background value and then introduction of the substance to be measured and reading of the value obtained. This requires considerable a large time and great attention on the part of the person who is to carry out the measurements so that no errors in adjustment occur, and furthermore automatic operation is not readily possible.

Automatic operation is provided by a known device, which compares the voltage of the light receiver coming from the background value of the paper with a preset desired voltage. In case of a deviation in the voltage, the lamp current is adjusted by a circuit provided with a storage until there is obtained an illumination which corresponds to the desired value and eliminates the deviation in the background voltage.

The comparator is now disconnected from the storage. With the lamp brightness which is now set, the rest of the measurement is carried out. The measurement amplifier together with the indicating unit remains connected for the entire time to the light receiver so that the balancing procedure is unnecessarily recorded and a sort of sawtooth curve results. There is also the disadvantage, that the adjusting of the lamp to the new brightness has a certain amount of inertia inherent in it which delays the measurement. Furthermore, the control of the brightness leads to difficulties in apparatus which contains narrow-band filters to recognize differences in discoloration, since the light spectrum irradiated also changes with the change in the current of the lamp. The same difficulty is to be expected when the fatigue of the light receiver is counteracted by increasing the brightness of the lamp.

These and other devices will become more readily apparent from the following description, reference being will be made to the accompanying drawing, in which:

FIG. 1 is a diagrammatic elevational view of an apparatus equipped according to the invention if desired with a comparison chamber of exactly the same construction as the measurement chamber;

FIG. 2 is a circuit diagram of an apparatus in accordance with the present invention, from which the manner of action can be noted;

FIG. 3 is a diagram illustrating the time sequence of a measurement with the apparatus of the invention;

FIG. 4 is another circuit diagram according to the invention.

Referring now to the drawing, particularly to FIGS. 2 and 3 the method of the present invention, which avoids the above described disadvantages, for the avoiding of errors in indication due to the properties of the paper in apparatus, which use a paper tape as measurement means is characterized by the fact that a presignal corresponding to the background value of the paper is momentarily produced at the same point of the paper tape upon the start of the introduction of the gas and electronically stored in storage 2, a signal is given continuously during the action of the gas to a difference stage 4, and the difference between the presignal and a final signal via line 3 determined at the end of the time of action of the gas is fed by the difference stage 4 to an electronic end signal storage 5 and made evident therein by an indicator 6.

The present invention also relates to an apparatus for carrying out the method, comprising essentially a measurement chamber and possibly a comparison chamber (not shown) with a source of light, light receiver or receivers in a bridge circuit with indication and means for transporting a test paper and treating it with gas, and it is characterized by the fact that the light receiver or the light-receiver bridge circuit is connected both with an electronic presignal storage 2 and directly with an input to a difference stage 4 the second input of which difference stage 4 is connected with the output of the presignal storage 2 and the difference stage is connected to an indicating storage 5 and a switch mechanism is provided for actuating a first switch 51 between the light receiver E and the input of the presignal storage 2 and an input to the difference stage, respectively and actuating a second switch 52 between the output of the difference stage 4 and the input of the indicating storage 5.

In this way, in accordance with the present invention, a presignal which is substantially identical to the previous zero value is measured and stored immediately after fresh paper has been introduced into the measurement chamber and before the action of the gas has fully started. The final signal which is obtained at the end of the time of action of the gas and which is identical with the previous measured value is now reduced by the stored presignal. This difference between final signal and presignal is the new measured value in accordance with the present invention.

This measured value is free of any preloading of the measurement paper since all disturbing irregularities are eliminated by the formation of the difference between two measurement signals from the same place on the paper.

The invention makes it possible to proceed in the following fashion:

In the apparatus, one starts in accordance with the present invention from an electrically adjusted zero point, which need not be readjusted and determines the presignal as well as the discoloration signal with respect to this zero point. By the formation of the difference between end signal and presignal, the measured value is independent of the zero point established by the paper, since only the difference or change the in color which is a measure of the concentration of the gas to be measured, measured at the same point of the paper, enters into the measurement. In this way a substantial improvement is obtained, since the varying properties of the paper are automatically taken into consideration by the detecting of the paper presignal and its use for the formation of the starting signal, so that the measured value corresponding to the concentration of the gas is free from any influence by any defect in the paper.

In order to exclude all other influences which interfere with the precision of the measurement, such as variations in properties of the lamp and of the light receiver which are produced by the influence of changes in temperature and aging during the life of the measurement apparatus, the invention is advantageously supplemented in the manner that the apparatus are provided with a comparison chamber and light receivers $B_1$ and $B_2$ in a bridge circuit Br. Changes in the lamp act simultaneously and to the same extent on the signals of the measurement and comparison chambers. Light receivers of the same type and age are subject, as is known from experience, to the same changes by temperature and time, so that in the case of a bridge circuit the bridge ratio remains practically the same.

Thus by this arrangement, one lamp for the illuminating of the paper in both chambers and bridge circuit Br of the light receivers, there is obtained a high degree of long-time stability which is an important prerequisite for apparatus which are to require only a small amount of maintenance, so that the advantage of the present invention of excluding inequalities in the paper can be fully utilized.

The same effect of suppressing the change in properties of lamp and light receivers can be obtained even if the comparison chamber is merely simulated and is not developed mechanically like the measurement chamber. If moist test tapes must be used, as for instance, for the detection of hydrogen sulfide, a bleaching effect results from the fact that the stream of measurement gas passing through the paper dries the paper at this place and an apparently negative measured value is obtained. This error can be avoided by having a stream of air which is free of the gas to be analyzed flow through the paper in the comparison chamber in exactly the same manner as the gas to be measured flows through the paper in the measurement chamber. In order not to obtain any loss in sensitivity due to the drying out of the tape (the moisture is important for the reaction of the gas with the tape-impregnating agent), the paper in this case is not advanced by a single width of the chamber window but by two such widths so that fresh paper comes into the measurement chamber rather than paper which has already been predried in the comparison chamber.

If the paper is advanced by only one width of window, the paper used as comparison place in the preceding measurement has become the measurement place. If the paper, however, is advanced by two widths, then the former comparison place has been pulled through the measurement chamber and lies outside it, so that it is no longer included in the measurement.

In order to avoid errors which occur as a result of the formation of gloss on the measurement paper due to the precipitating of the impregnation salt or, for instance in case of hydrogen sulfide, by the lustrous sulfide coating formed, rather than measuring the directly reflected light, the scattered light is in known manner measured. The illuminating of the measurement and comparison chambers is effected by the source of light in such a manner that the light is projected by a lens onto the paper parallel at an angle of about 45°, the portion of directly reflected light being reflected back at the same angle by the tape and being completely absorbed by a dull black wall, and the light receivers being located approximately vertically above and parallel to the part of the paper tape struck by the light and therefore not being contained in the path of the directly reflected light.

Referring now again to FIGS. 1 and 2, the measurement is now effected in the following manner:

The pressing pistons which assure the outer sealing off of the paper are raised and the paper is advanced (a in FIG. 3) a distance equal to one or more widths of window. After the paper has come to a stop, the pressing pistons are applied again in order to seal off the paper and the measurement gas is forced or drawn through the paper in the measurement chamber, while at the same time the light receiver is connected by the switch $S_1$ (presignal formation b in FIG. 3) to the presignal storage I and the latter is charged to the presignal (storage C in FIG. 3). The detecting of the presignal and the charging of the corresponding storage is a rapid process which advantageously is to be completed in less than 2% of the period of action of the gas (g in FIG. 3), so that no substantial discoloration takes place as yet.

In apparatus, in which the feeding of the gas is interrupted by a valve during the advance of the paper, no gas is present any longer from the preceding measurement, since the measurement chamber is advantageously evacuated during this time. However, even in apparatus with continuous flow of measurement gas, practically no disturbance occurs, since the paper comes into contact with the measurement gas only on its surface during its advance. The discoloration occurs only upon intimate contact of the gas with the reagent distributed in the tape and therefore the gas is furthermore not blown against the surface but forced or drawn through the tape. Furthermore, the lamp radiation contains preferably predominantly infrared portions and the light receivers are substantially infrared portions and the light receivers are substantially sensitive to infrared, so that the discoloration is measured into the center of the tape and not merely on the surface.

After the storage of the presignal, the light receiver E is connected directly to the one input of the difference stage 4C; (measurement d in FIG. 3) the other input of the difference stage 2 is connected to the output of the presignal storage. In this stage 4 the difference between the value of the presignal and the value of the final signal, which difference corresponds to the discoloration of the tape by the gas, is now automatically formed.

At the end of the time of action of the gas, the output of the difference stage 4 is connected by the switch $S_2$ (at e in FIG. 3) to the measured-value (final signal less presignal) storage 5 which produces the indication at indicator 6. After the charging of the measured value storage which takes place in a very short time as compared with the duration of the final signal in less than 2% of the time of the action of the gas, the paper is advanced by an amount equal to one or two widths of the window and the process is repeated.

In this manner there is obtained a steady indication the deflections of which are caused solely by the measured value and are not distorted in addition by the properties of the paper, such as uniformity and gloss of the surface, thickness, absorptivity or porosity.

The advance in the art represented by the present invention, however, does not reside merely in the substantial improvement in the zero value but also in the improvement of the precision of the measured-value signal, so that now substantially smaller concentrations can be measured within the scope of emission in the contamination of the air.

We claim:

1. A method of avoiding errors in indication due to the properties of the paper in apparatus which uses a paper tape as a means of gas measurement, comprising the steps of causing a gas to act on a paper tape, producing momentarily a presignal corresponding to a background of said paper tape at a point of the paper tape upon the commencement of the action of a gas on said paper tape, electronically feeding a second signal corresponding to the action of said gas on said paper tape continuously during the action of the gas into a difference stage, and forming a difference between said presignal and said second signal determined at an end of the time of action of said gas by said difference stage, and causing said difference to be indicated.

2. An apparatus for avoiding errors in indication due to the properties of the paper in apparatus which uses a paper tape as a means of gas measurement, comprising a gas measurement chamber with a source of light and adapted to receive a paper tape, at least one light receiver means in a circuit for receiving light from said paper tape, means for advancing said paper in said chamber and causing said gas to act on it, an electronic presignal storage means having an output, the latter continuously providing a stored output signal, a difference stage having a first input connected to said output of said presignal storage means and having a second input, said at least one light receiver being operatively connected selectively both with said electronic presignal storage means and with said second input of said difference stage, an indicator storage operatively connected to said difference stage, a first switch means for selectively connecting said at least one light receiver initially to said presignal storage means as said tape enters said chamber yet before substantial action of said gas occurs on said tape and for then connecting said at least one light receiver to said second input of said difference stage, and a second switch means between said difference stage and said indicat or storage for operative connection of said difference stage and said indicator storage after a period of action of said gas on said paper tape.

* * * * *